(12) United States Patent
Surowiecki (10) Patent No.: US 6,854,237 B2
(45) Date of Patent: Feb. 15, 2005

(54) STRUCTURAL WALLS

(75) Inventor: Matt F. Surowiecki, Sammamish, WA (US)

(73) Assignee: Steeler Inc., Seattle, WA (US)

( * ) Notice: Subject to any disclaimer, the term of this patent is extended or adjusted under 35 U.S.C. 154(b) by 0 days.

(21) Appl. No.: 10/387,982

(22) Filed: Mar. 13, 2003

(65) Prior Publication Data

US 2004/0003564 A1 Jan. 8, 2004

Related U.S. Application Data

(63) Continuation-in-part of application No. 10/035,488, filed on Oct. 19, 2001, now abandoned, which is a continuation-in-part of application No. 09/293,074, filed on Apr. 16, 1999, now Pat. No. 6,374,558.

(51) Int. Cl.$^7$ .................................................. E04C 3/02
(52) U.S. Cl. ......................... 52/633; 52/731.1; 52/690; 52/745.21; 52/241; 52/243; 52/481.1; 52/733.2; 52/731.9; 403/262; 403/230
(58) Field of Search ............................... 52/633, 731.1, 52/639, 745.21, 241, 243, 481.1, 483.1, 573.1, 733.2, 731.9; 582/690; 403/230, 262

(56) References Cited

U.S. PATENT DOCUMENTS

| | | | | | |
|---|---|---|---|---|---|
| 1,729,439 | A | * | 9/1929 | Gordee | 52/241 |
| 4,315,386 | A | * | 2/1982 | Clarke | 52/93.1 |
| 4,638,615 | A | * | 1/1987 | Taylor | 52/364 |
| 4,805,364 | A | * | 2/1989 | Smolik | 52/241 |
| 4,869,040 | A | * | 9/1989 | Howell | 52/633 |
| 4,918,899 | A | * | 4/1990 | Karytinos | 52/690 |
| 5,069,143 | A | * | 12/1991 | Bunger | 108/57.2 |
| 5,127,760 | A | * | 7/1992 | Brady | 403/230 |
| 5,203,132 | A | * | 4/1993 | Smolik | 52/241 |
| 5,274,973 | A | * | 1/1994 | Liang | 52/243 |
| 5,394,665 | A | * | 3/1995 | Johnson | 52/241 |
| 5,452,556 | A | * | 9/1995 | Taylor | 52/730.7 |
| 5,471,805 | A | * | 12/1995 | Becker | 52/241 |
| 5,664,388 | A | * | 9/1997 | Chapman et al. | 52/653.1 |
| 6,021,618 | A | * | 2/2000 | Elderson | 52/481.1 |
| 6,199,336 | B1 | * | 3/2001 | Poliquin | 52/489.1 |
| 6,240,687 | B1 | * | 6/2001 | Chong | 52/238.1 |
| 6,282,862 | B1 | * | 9/2001 | Weeks | 52/731.3 |
| 6,484,460 | B2 | * | 11/2002 | VanHaitsma | 52/293.1 |

OTHER PUBLICATIONS

International Pub. No.: WO 88/10344 Jun. 1988 Meyer, Dolph.*

* cited by examiner

*Primary Examiner*—Carl D. Friedman
*Assistant Examiner*—Nahid Amiri
(74) *Attorney, Agent, or Firm*—Delbert J. Barnard (57) ABSTRACT

A plurality of studs (14) are spaced apart relative to each other. Upper end portions (32) of the studs fit into an upper channel space (22) and lower end portions (34) fit into a lower channel space (30). The lower channel space (30) is defined in part by a pair of spaced apart sidewalls (24, 26). Screw fasteners (52) extend through the sidewalls (24, 26) and connect them to the lower end portion (34) of the stud (14). The studs (14) have upper ends that are spaced from a web (20) forming the upper boundary of the upper channel space (22). Vertical elongated slots (48, 50) are provided in the sidewalls (38, 40) of the studs (14). Screw fasteners extend through the sidewalls (16, 18) of the upper channel member (10) and then extend into and through the slots (48, 50). The heads of the screw fasteners (52) bear against the sidewalls (16, 18) when the screw fasteners (52) are tightened. This firmly connects the screw fasteners (52) to the sidewalls (16, 18), but there is no connection of the screw fasteners (52) to the upper end portions of the studs (14). When the screw fasteners (52) are tightened, there is no clamping action between the heads (54) of the screw fasteners (52) and the upper end portions (32) of the studs (14). As a result, the studs (14) are completely free to move up and down relative to the upper channel member (10), within limits established by the lengths of the slots (48, 50).

10 Claims, 8 Drawing Sheets

STRUCTURAL WALLS

RELATED APPLICATIONS

This is a continuation-in-part of my copending application Ser. No. 10/035,488, entitled Slotted Metal Stud, filed Oct. 19, 2001 abandoned, as a continuation-in-part of my prior application Ser. No. 09/293,074, filed Apr. 16, 1999, entitled Wall Beam And Stud, and now U.S. Pat. No. 6,374,558 B1, granted Apr. 23, 2002.

TECHNICAL FIELD

The present invention relates to wall structures composed of sheet-metal frame members and to a method of constructing wall structures from such sheet-metal frame members. More particularly, the invention provides a wall structure in which a horizontal frame member at the top of the wall structure, and an overhead structure to which it is connected, are able to move vertically relative to the remainder of the wall structure, such as during an earthquake or as settlement occurs.

BACKGROUND OF THE INVENTION

My aforementioned U.S. Pat. No. 6,374,558 includes a comprehensive Background of the Invention. Additional background information is set forth by U.S. Pat. No. 4,805,364, granted Feb. 21, 1989 to Robert A. Smolik; buy U.S. Pat. No. 5,127,203, granted Jul. 7, 1992 to Robert F. Paquette; by U.S. Pat. No. 5,127,760, granted Jul. 7, 1992, to Todd A. Brady; by U.S. Pat. No. 5,685,121, granted Nov. 11, 1997 Frank De Framcesco and Joseph D. Alumbo; and by U.S. Pat. No. 5,313,752, granted May 24, 1994, to Michael A. Hatzinikolas.

A problem with most of the systems disclosed by Smolik U.S. Pat. No. 4,805,364; Paquette U.S. Pat. No. 5,127,203; Brady U.S. Pat. No. 5,127,760 and DeFramesco et al. U.S. Pat. No. 5,313,752 is that the components of the systems are expensive to manufacture. Another problem of the systems disclosed by Paquette U.S. Pat. No. 5,127,203 and Brady U.S. Pat. No. 5,127,760 is that the upper frame members are weakened by the way they are constructed. An object of the present invention is to provide a construction of the frame members which renders them economical to manufacture and results in stronger upper frame members and a stronger wall structure.

As disclosed in the above identified patents, the horizontal and vertical frame members are constructed from sheet-metal and are channel shaped. The upper horizontal frame member is in the form of a downwardly opening channel member having opposite sidewalls and a web that extends between the upper edges of the sidewalls. The lower frame member is in the form of an upwardly opening channel member. It has opposite sidewalls and a web that extends between the lower edges of the sidewall. The vertical frame members (or "studs") are also channel-shaped, except that they include also lips which extend inwardly in coplanar parallelism from the edges of the sidewalls that are distal the web.

The systems disclosed by Paquette U.S. Pat. No. 5,127,203 and Brady U.S. Pat. No. 5,127,760 each include an upper channel member having screw receiving slots in its sidewalls. The upper ends of the studs are positioned within the upper channel member between a pair of opposed slots, such as shown by FIG. 1 of Brady U.S. Pat. No. 5,127,760. The upper channel members are typically provided with a large number of slots so that there is a large number of places to secure the studs to the upper frame member. Consequently, most of the slots in the upper channel member remain unused in a given application. Although they are unused, they still require a cost to make, and there presence acts to weaken the upper channel member.

In the systems disclosed by Paquette U.S. Pat. No. 5,127,203 and Brady U.S. Pat. No. 5,127,760, the slots in the upper channel members are outside of the upper end portions of the studs. Sheet-metal screw fasteners extend through the slots and are screwed into the sidewalls of the upper ends of the studs. The screws are intended to slide in the slots during vertical movement of the studs relative to the upper frame members. When the screws are tightened too much, which happen often, the studs are clamped between the heads of the screw fasteners and the upper end portions of the studs. This clamping retards and often prevents movement, often causing damage to the wall structure.

De Framcesco et al. U.S. Pat. No. 5,685,121 discloses studs composed of telescopically connected upper and lower portions, making them costly to manufacture. The sidewalls of one of the end portions includes longitudinal slots. Screw fasteners extend through the sidewalls of the other end portion and extend into the slots. The upper end portion fits snugly within the downwardly extending channel space of the upper frame member. The upper end of the upper end portion extends upwardly to the web of the upper frame member.

An object of the present invention is to provide a system which obviates the high cost of manufacturing the upper channel member and maintains the studs free for vertical movement relative to the upper channel member. Another object of the invention is to provide a system in which the placement of the studs is not limited to the location of preformed slots in the sidewalls of the upper channel member, but rather the studs can be placed at any location along the upper channel member and then be connected to the upper channel member at that location and remain free to move vertically relative to the upper channel member.

An object of the present invention is to provide a simplified framing system in which the studs and the upper and lower channel members are all relatively inexpensive to manufacture, and the screw fasteners used to secure the studs to the channel members can be tightened without causing the sidewalls of the upper channel member to be clamped between the sidewalls of the studs and the heads of the screw fasteners.

BRIEF SUMMARY OF THE INVENTION

A structural wall according to the present invention is basically characterized by an elongated, downwardly opening, sheet-metal, upper channel member having spaced apart sidewalls which define an upper channel space between them, and by sheet-metal studs. The sheet-metal studs include upper end portions sized to fit within the upper channel space. The upper end portions of the studs comprise sidewalls that are contiguous the sidewalls of the upper channel member when the upper end portions of the stud are within the upper channel space. At least one sidewall of the upper end portion of each stud includes a longitudinal slot positioned for receiving the shank portion of a screw fastener. The slot is wider than the shank portion of the screw fastener and is long enough to permit a desired amount of vertical movement of the stud relative to the screw fastener and the upper channel member. The screw fasteners are adapted to be tightened to firmly connect them to the sidewalls of the upper channel member. The shank portions of the screw fasteners are in the slots, free of connection with the upper end portions of the studs. During wall movement, the studs can move up and down relative to the screws and the upper channel member. There is no clamping of the sidewalls of the upper channel member between the heads of the screw fasteners and the upper end portions of the studs.

In preferred form, there is a longitudinal slot in each sidewall of the upper end portion of the stud and there are two screw fasteners for each stud, one for each slot. Each screw fastener is connected to a different one of the sidewalls of the upper channel member and each extending into and through the slot in the contiguous sidewall of the stud. In preferred form, the structural wall comprises the aforementioned sheet-metal upper channel member, and a sheet-metal lower channel member having spaced apart sidewalls defining a lower channel space between them. A plurality of elongated studs are spaced apart in parallelism and each said stud includes an upper end portion positioned within the upper channel space and a lower end portion positioned within the lower channel space. The lower end portion of each stud has spaced apart sidewalls that are contiguous the sidewalls of the lower channel member. Screw fasteners firmly connect the sidewalls of the lower channel member to the sidewalls of the lower end portions of the studs. The upper end portions of the studs and the upper channel members are constructed and arranged in the manner previously described. There are slots in the upper end portions of the studs and screw fasteners are connected to the sidewalls of the upper channel member. The screw fasteners include shank portions that extend into and through the slots in the studs.

According to a method of the invention, an upper channel member is supported in an overhead position with its channel space directed downwardly. The lower channel member is secured in a position below the upper channel member, with its channel space confronting the upper channel space. A plurality of studs are spaced apart in parallelism with each other. The lower end portions of the studs are positioned within the lower channel space and the upper end portions of the studs within the upper channel space. The studs are moved sideways along the upper channel members to place them in desired positions. Then, screw fasteners are inserted through the sidewalls of the upper channel member at locations outwardly of the slots in the upper end portions of the studs. The screw fasteners are firmly secured to the sidewalls of the upper channel member, with their shank portions extending inwardly through the slots. The screw fasteners are free of connection with the studs. The sidewalls of the upper channel members are not clamped between the heads of the screw fasteners and the upper end portions of the studs.

Other objects, advantages and features of the invention will become apparent from the description of the best mode set forth below, from the drawings, from the claims and from the principles that are embodied in the specific structures that are illustrated and described.

BRIEF DESCRIPTION OF THE SEVERAL VIEWS OF THE DRAWING

Like reference numerals are used to designate like parts throughout the several views of the drawing, and.

DETAILED DESCRIPTION OF THE INVENTION

Referring to the drawing, the structure shown by FIGS. 1–13 is essentially the same structure that is disclosed by FIGS. 20–22 of my prior application Ser. No. 09/293,074, filed Apr. 16, 1999 (now U.S. Pat. No. 6,374,558 B1, granted Apr. 23, 2002), and also disclosed by FIGS. 1–6 of my copending application Ser. No. 10/035,488, filed Oct. 19, 2001, as a continuation-in-part of the prior application Ser. No. 09/293,074.

Figure 1:
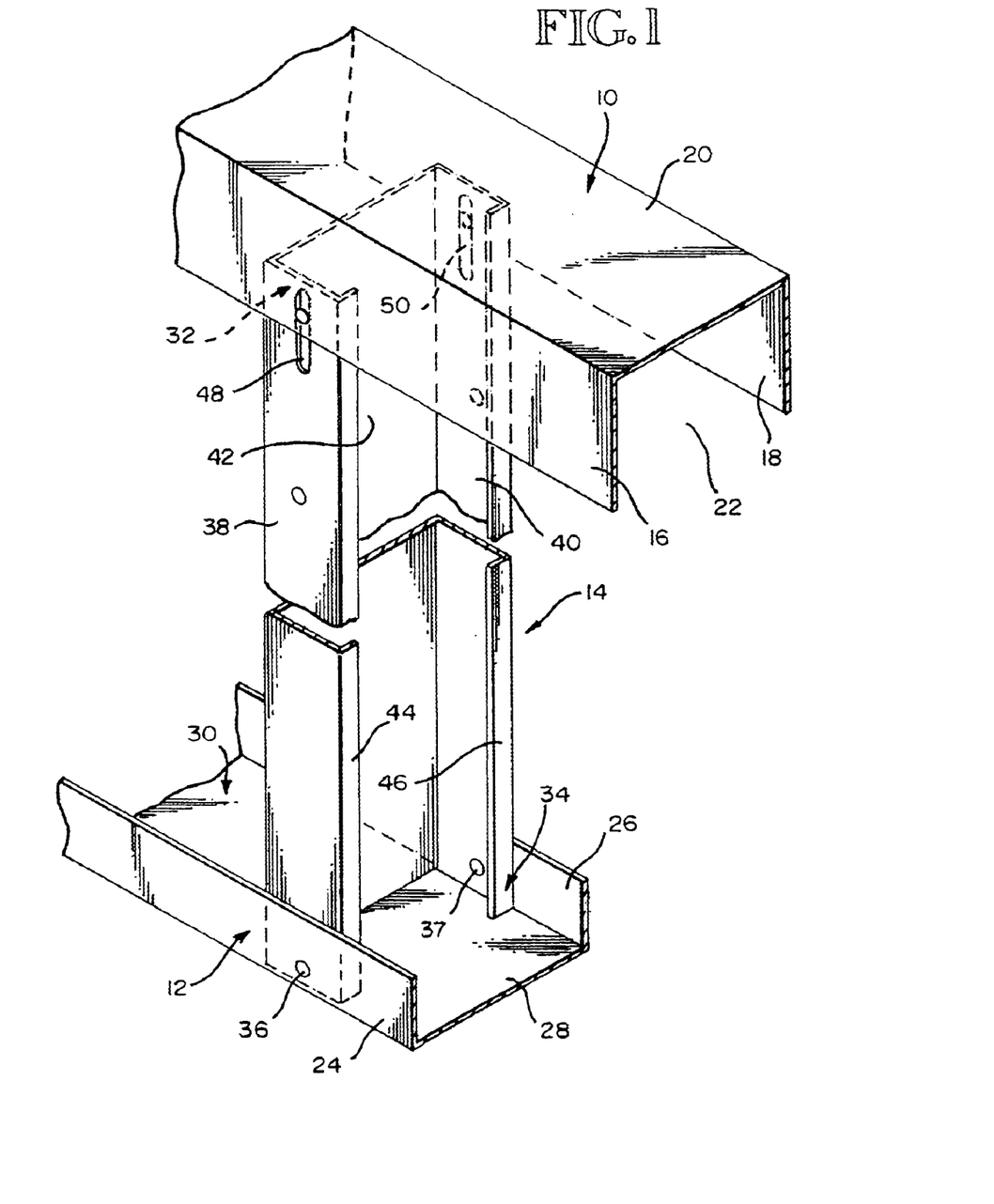
FIG. 1 is a pictorial view of a sheet-metal stud and upper and lower sheet-metal channel members, such view being taken from above and looking towards the top and one side of the structure that is illustrated, and towards the open side of the stud channel, with a center portion of the stud being cut away for the purpose of indicating indeterminate length, and with the upper and lower channel members being shown in cross-section.
Figure 2:
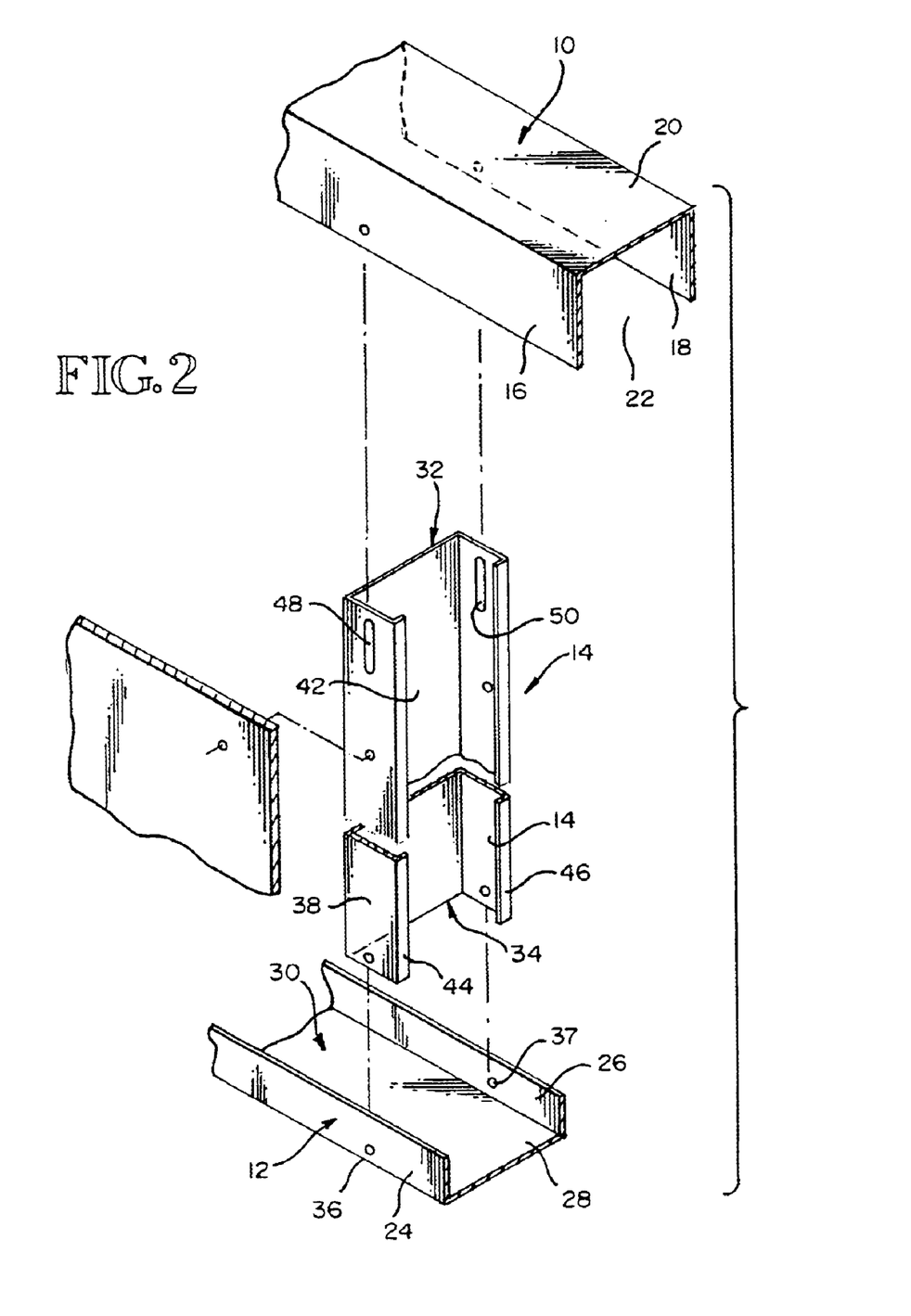
FIG. 2 is a view like FIG. 1, but with the channel members and the stud shown exploded apart and further showing a fragmentary portion of some sheeting that is attached to the stud.

Referring specifically to FIGS. 1 and 2 of the drawing, the framing structure that is illustrated comprises an upper channel member 10, a lower channel member 12 and a stud 14. All three of these members 10, 12, 14 are constructed from sheet-metal. The upper channel member 10 is connected to a suitable overhead support, and the lower channel member 12 is connected to a suitable lower support. Channel member 10 includes opposite sidewalls 16, 18 interconnected at their upper edges by a web 20. The sidewalls 16, 18 depend from the web 20 and the three members 16, 18, 20 form an upper channel space 22. The lower channel member comprises first and second sidewalls 24, 26 that are interconnected by a web 28. Members 24, 26, 28 form an upwardly opening channel space 30. When channel members 10, 12 are within the wall structure, they are spaced apart vertically and the channel spaces 22, 30 confront each other.

The studs 14 each include an upper end portion 32 and a lower end portion 34. The lower end portion 34 fits down inside the channel space 30. Screw fasteners extend through openings 36, 37 in sidewalls 24, 26 and firmly connect the sidewalls 24, 26 (and hence the lower channel member 12) to the lower end portion 34 of the stud 14. The upper end portions 32 of the studs 14 fit within the upper channel space 22. As shown in several of the views, the studs 14 have upper ends that are spaced downwardly from the web 20. The studs 14 have opposite sidewalls 38, 40 that are connected together along common side edges by a web 42. The opposite side edges are provided with lips 44, 46 that turn inwardly and extend in coplanar parallelism. The sidewalls 38, 40, the web 42 and the lips 44, 46 form a lipped channel construction. This construction is shown by FIG. 21 of U.S. Pat. No. 6,374,558 and FIGS. 1, 3, and 5 of application Ser. No. 10/035,488.

As shown by several of the Figures in the drawing, the sidewalls 38, 40 of the upper end portions of the studs 14 are provided with longitudinal slots 48, 50, having closed upper and lower ends. They conform to slots 87 shown in U.S. Pat. No. 6,374,558 and slots 24 shown in Ser. No. 10/035,488.

As shown by FIGS. 1, 3, 4, and 9 of the drawing, for example, the upper end portions 32 of the studs 14 extend only partway into the upper channel space 22 and the upper channel member 10. The upper ends of the studs 14 are thus spaced downwardly from the web 20. This provides a vertical space within the channel space 22 below the web 20 in which the upper ends of the studs 14 can move in the vertical direction. This arrangement of the upper ends of the studs to the web of the upper channel member 10 is the same as what is disclosed in FIG. 22 of U.S. Pat. No. 6,374,558 and FIGS. 2, 3, 5 and 6 of application Ser. No. 10/035,488.

Figures 3, 4, 5, 6, 7, 8:
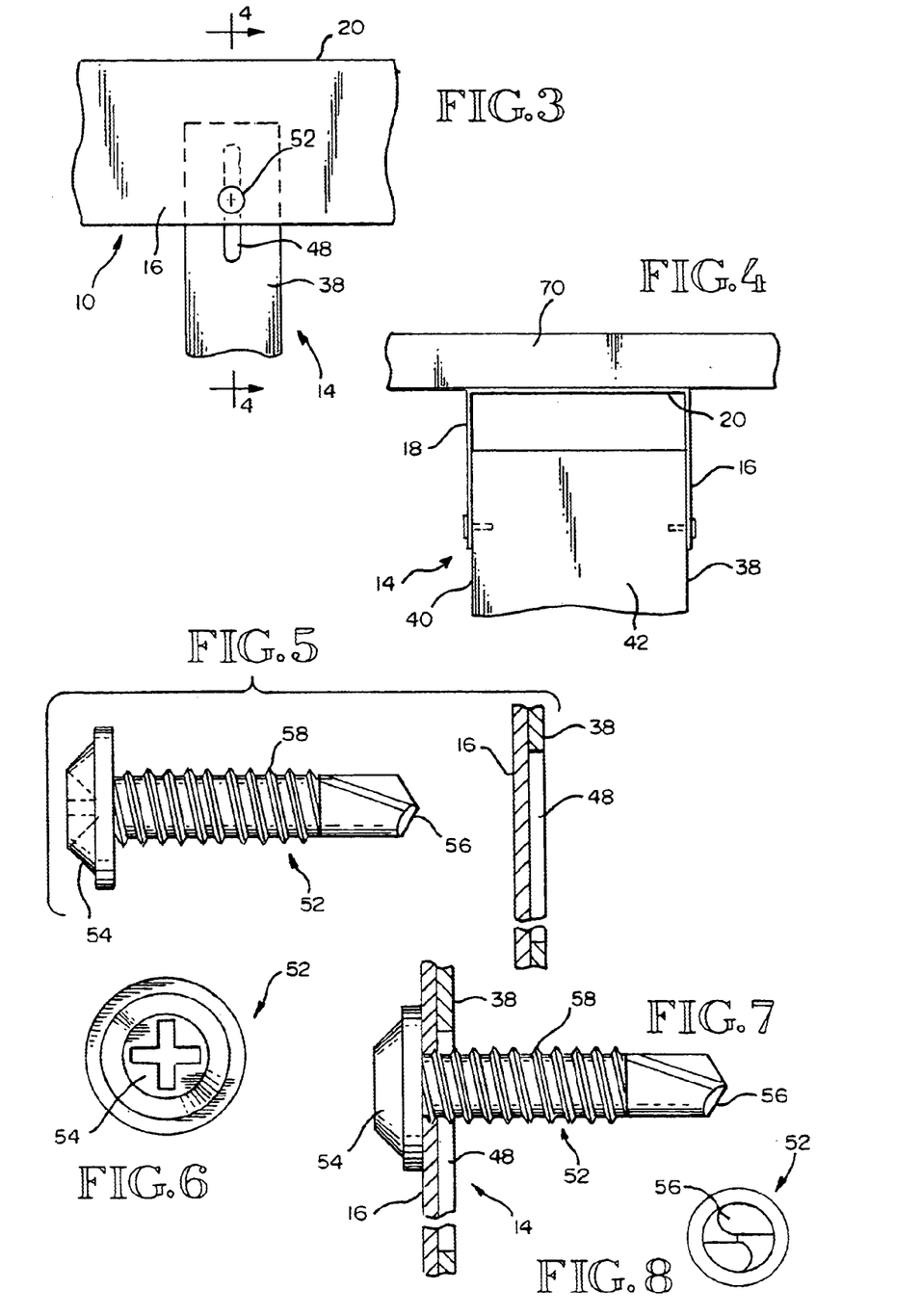
FIG. 3 is a fragmentary side elevational view looking towards a portion of the upper channel member where such channel member is connected to the upper end portion of a stud.
FIG. 4 is a view taken substantially along line 4—4 of FIG. 3, and showing a top support for the upper channel member added to the view.
FIG. 5 is a view showing a sheet-metal screw fastener spaced outwardly from a sidewall of the upper channel member, such view showing a sidewall of the upper end portion of a stud positioned adjacent the sidewall of the upper channel member, and showing a slot in the sidewall of the upper end portion of the stud.
FIG. 6 is an end view looking towards the head end of the screw fastener that is shown in FIG. 5.
FIG. 7 is a view like FIG. 5, showing the screw fastener connected to the sidewall of the upper channel member and extending through the slot in the sidewall of the upper end portion of the stud.
FIG. 8 is an end view looking towards the point end of the screw fastener.

Screw fasteners 52 extend inwardly through the sidewalls 16, 18 of the upper channel member 10 and then extend into and through the slots 48, 50. The screws 52 have a head 54 at one end, which becomes the outer end of the screw 52 in the assembly, and a pointed opposite end 56. There is a threaded shank 58 between the head 54 and the pointed end 56. The screws 52 screw into small openings in the sidewalls 16, 18 and firmly connect the screws 52 to the sidewalls 16, 18. The screws 52 are rotated until the heads 54 are against the sidewalls 16, 18 and the screws 52 are firmly connected to the sidewalls 16, 18. When the screws 52 are firmly connected to the sidewalls 16, 18, the shanks 58 are within the slots 48, 50 and are free of connection with the sidewalls 38, 40. Thus, the screws 52 are firmly connected to the sidewalls 16, 18 of the upper channel member 10, but are free of connection with the sidewalls 38, 40 of the studs 14. FIG. 7 shows a screw fastener 52 connected to sidewall 16 and the screw shank 58 within slot 48. This same arrangement exists on the opposite side of the stud 14 where a threaded shank 58 of another screw 52 extends into and through the slot 50. This arrangement of the screws to the slots is shown in U.S. Pat. No. 6,374,558 in which the screws are designated 88 and the slots are designated 87, and also in application Ser. No. 10/035,488, in which the screws are designated 120 and the slots are designated 24.

The wall structure shown by FIG. 9 will now be described. The upper channel member 10 is connected to an overhead structure 70 (FIGS. 4, 10–12 and 17). The lower channel member 12 is connected to a lower support structure (not shown) the upper support structure 70 may be a building floor that is above the wall that is being connected. The support structure for the lower channel member 12 may be a lower floor of the same building. During an earthquake, for example, the upper support structure 70 may want to move up and down relative to the lower support structure. That is why the upper frame member 10 is constructed and arranged such that it can move with its support structure 70 up and down relative to the lower support structure and the rest of the wall components, including lower channel member 12 and the studs 14.

The upper channel member 10 is mounted vertically above the lower channel member 12. The upper channel space 22 confronts the lower channel space 26.

Figure 9:
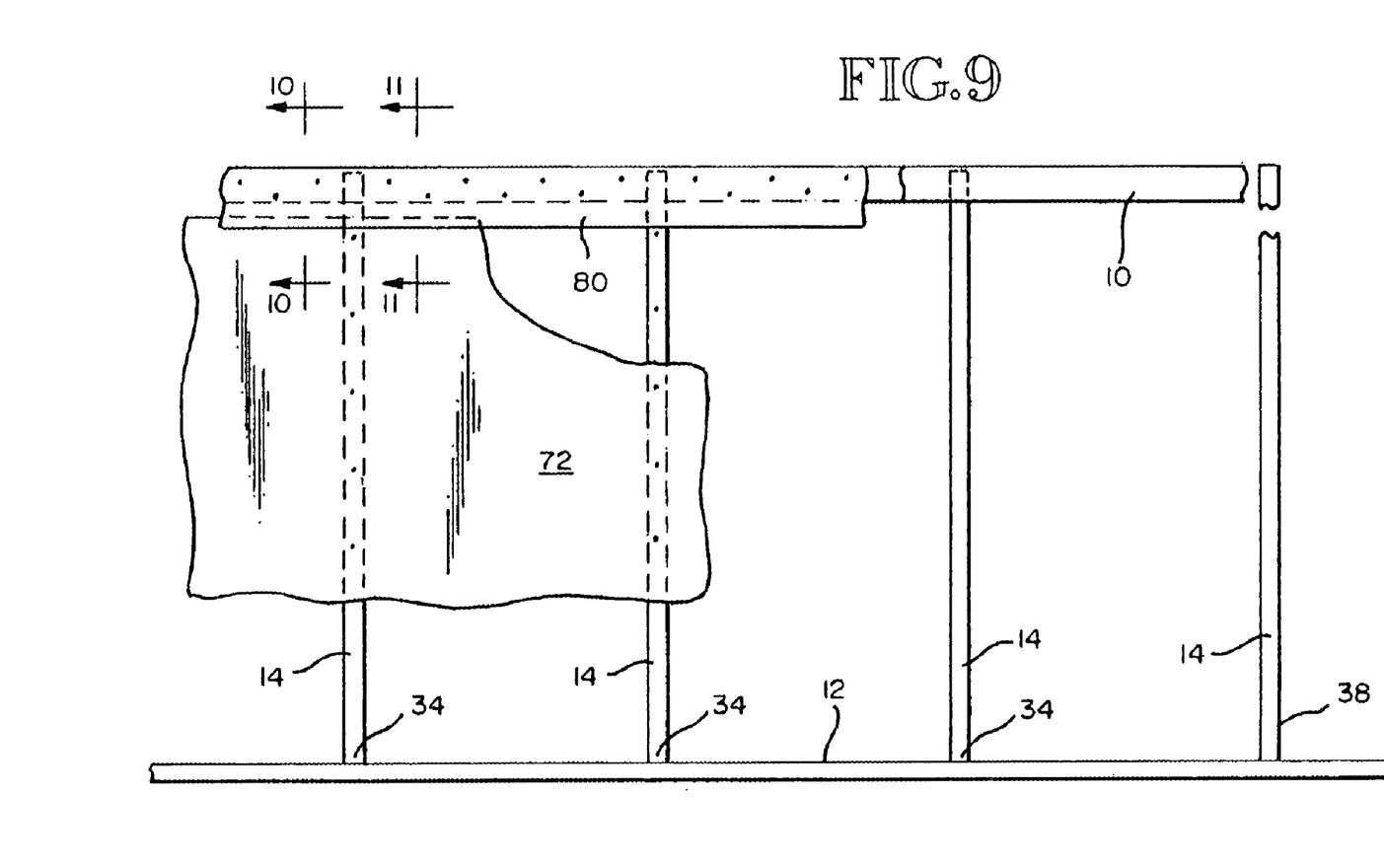
FIG. 9 is a fragmentary side elevational view of a wall structure showing portions of the upper and lower channel members, a plurality of studs, and portions of sheeting material that is connected to the studs and the upper channel member.

A desired number of studs 14 are selected and they are positioned as illustrated in FIG. 9. Their lower end portions 34 are placed within the lower channel space 28 and positioned to set down on the lower web 38. The upper end portions 32 of the studs 14 are positioned within the upper channel space 22. The upper ends of the studs 14 are spaced downwardly from the upper web 20 an amount sufficient to allow movement to occur between the upper ends of the studs 14 and the upper web 20, an amount sufficient for the conditions that the building structure is expected to be encountered. The placement of the studs 14 includes moving them in a position lengthwise of the channel spaces 22, 30 while they are substantially vertical. When a given stud is at a desired location, screw fasteners 52 are installed in the openings 36, 70 and are used to connect the sidewalls 24, 26 of the lower channel 12 to the sidewalls 38, 40 at the lower end of the stud 14. Preferably, the lower ends of the studs 14 are resting on the web 28 when the fasteners 52 are installed. When these fasteners 52 are tightened, they grab onto both sidewall 24 and sidewall 48 on one side of the wall, and onto both sidewall 26 and sidewall 40 on the opposite side of the wall. This makes a firm connection between the lower fasteners 52 and the sidewalls of the lower channel member 12 and the lower end portion of the stud 14.

As shown by FIGS. 1, 3 and 4 of the drawing, when the lower ends of the studs 14 are resting on the lower web 28, the upper ends of the studs 14 are spaced downwardly from the upper web 20. A portion of slot 48 is inwardly adjacent sidewall 16. A portion of slot 50 is inwardly adjacent sidewall 18. Small holes are made in the sidewalls 16, 18 in alignment with the slots 48, 50. These holes may be drilled, using a conventional power drill, or the screw fasteners 52 may be constructed to bore their way through the sheet-metal walls 16, 18. FIG. 5 shows the sharp end 56 of a screw fastener 52 spaced outwardly from wall 16. When this screw fastener is moved inwardly, to place tip 56 against wall 16, and then the screw fastener 52 is rotated, it will bore a small opening through the wall 16. When the threads on the threaded shank 58 are reached, they will engage the portion of wall 16 immediately surrounding the opening. Then, when the screw fastener 52 is tightened, the threads will engage wall 16 substantially as shown in FIG. 7. The workman uses his power driver to rotate the screw fastener 52 and continues to rotate it until the head 54 is against wall 16. At that time, the wall 16 will be between the head 54 and threads on the threaded shank 58 that are close to the head 54. This firmly connects the screw fastener 52 to the wall 16. The rest of the threaded shank 58 is either within the slot 58 or inwardly of the wall 38. The threads do not engage any portion of the wall 38. Thus, while the screw fastener 52 is firmly connected to wall 16, it makes no connection with wall 38. This means that the studs 14, including walls 38, are free to move vertically within the distance allowed by the headroom in the upper channel space 22 and the length of the slots 48, 50.

The upper and lower channel members 10, 12 are formed by roll-forming sheet-metal strips to form channels. The side portions of the strips are bent by the roll-forming equipment to make them extend perpendicular from the central portions of the strip. According to the invention, this is all that has to be done to form the members 10, 12. The studs 14 are also formed by roll-forming equipment. The equipment bends side portions of sheet-metal strips relative to central portions of the strips, so as to form the sidewalls 38, 40, the web 42 and the lips 44, 46. The only other thing that needs to be done to the studs 14 is to provide the slots 48, 50 which can be done by the use of punches. The strips may be punched to form the slots 48, 50, and then bent to form the stud shape, or they may be bent first, and then punched.

As previously mentioned, the studs 14 may be placed anywhere along the lengths of the channels 10, 12, and then secured to the channels 10, 12. The placement of the studs is not limited to the location of slots in the channel member 10 as is the case in the systems disclosed by Paquette U.S. Pat. No. 5,127,203 and Brady U.S. Pat. No. 5,127,760. The system of the present invention eliminates the need for punching a large number of slots in the channel 10. This saves substantial cost of manufacture and avoids a weakening of the channel 10 that would be caused by a large number of slots in its sidewalls 16, 18. Also, in the system of the present invention, the screws first extend through and are anchored to the sidewalls 16, 18 of the channel 10. They then extend through the slots 48, 50, free of any connection to the stud 14. As a result, the workman can screw the screws 52 in tightly without interfering with the ability of the studs 14 to move vertically within the upper channel space 22. As previously mentioned, this is because the heads 54 of the screws 52 bear tight against the sidewalls 16, 18 and the shanks 58 of the screws 52 extend in and through the slots 48, 50, free of engagement with the sheet-metal bordering the slots 48, 50. Also, the screws 52 are fixed in position relative to the upper channel member 10. Thus, the screw heads 54 are not moved upwardly and downwardly with the studs 14, when they move, with heads 54 of the screws 52 contacting sheeting material that is outside of the studs 14.

Figure 10:
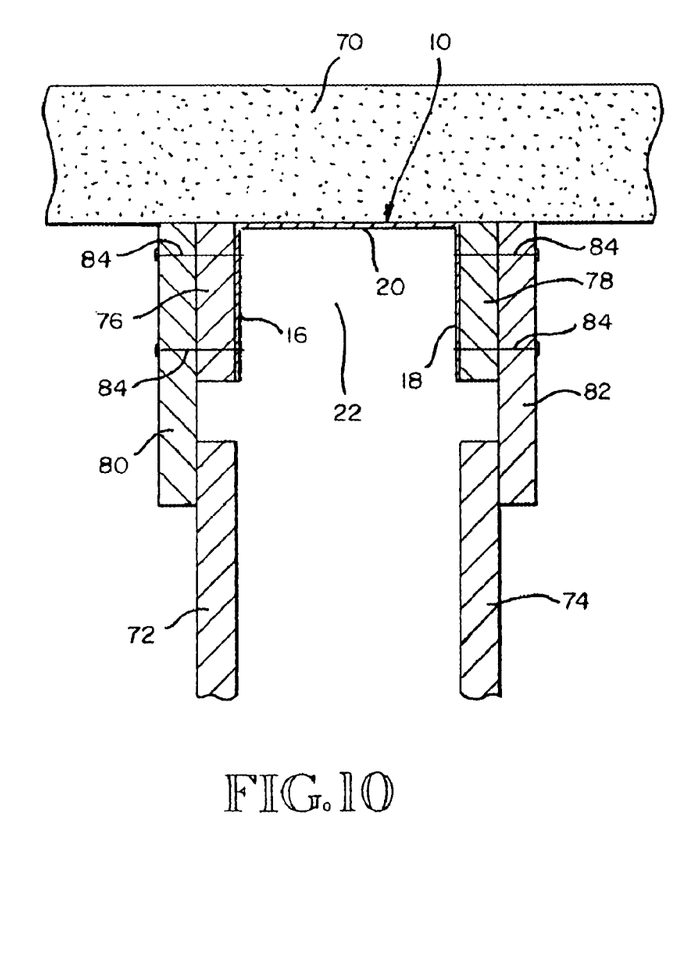
FIG. 10 is a sectional view taken substantially along line 10—10 of FIG. 9.
Figure 11:
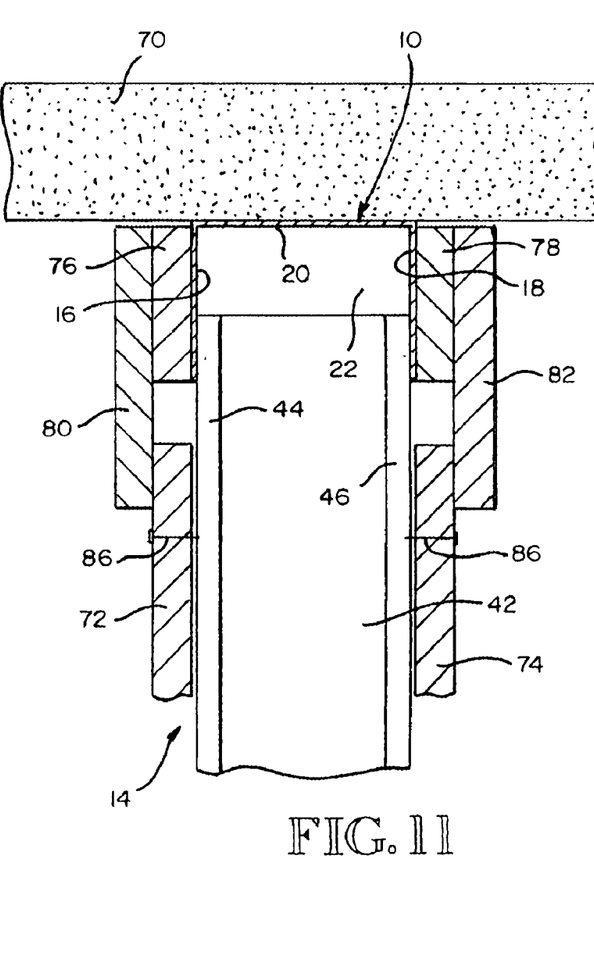
FIG. 11 is a sectional view taken substantially along line 11—11 of FIG. 9.

FIGS. 10 and 11 are based on the disclosure of FIG. 22 in my U.S. Pat. No. 6,374,558. Sheeting 72, 74 is connected to the opposite sides of the studs 14. The upper ends of the sheeting 72, 74 is spaced below the lower edges of the upper channel member 10. Narrow strips of sheeting 76, 78 are connected to the sidewalls 16, 18 of the upper channel member 10. Sheeting strips 76, 78 have lower edges that are spaced from and free of connection with the upper edges of the sheeting 72, 74. Wider sheeting strips 80, 82 are positioned outside of the sheeting strips 76, 78 and are connected to the sheeting strips 76, 78 and preferably also to the sidewalls 16, 18 of the upper channel member 10. This connection may be provided by screw fasteners 84. In FIG. 10, the screw fasteners 84 are shown to extend through sheeting strips 80, 82, then through sheeting strips 76, 78, and then through the sidewalls 16, 18 of the upper channel member 10. The sheeting strips 80, 82 have lower edge portions which overlap the upper edge portions of the sheeting 72, 74.

FIG. 11 shows screw fasteners 86 being used to connect the sheeting 72, 74 to the studs 14. The screws 86 extend inwardly, first through the sheeting 72, 74, and then through the sidewalls 38, 40 of the studs 14. There is no connection of the sheeting 72, 74 with the upper channel member 10 or with the sheeting strips 76, 78, 80, 82.

Figure 12:
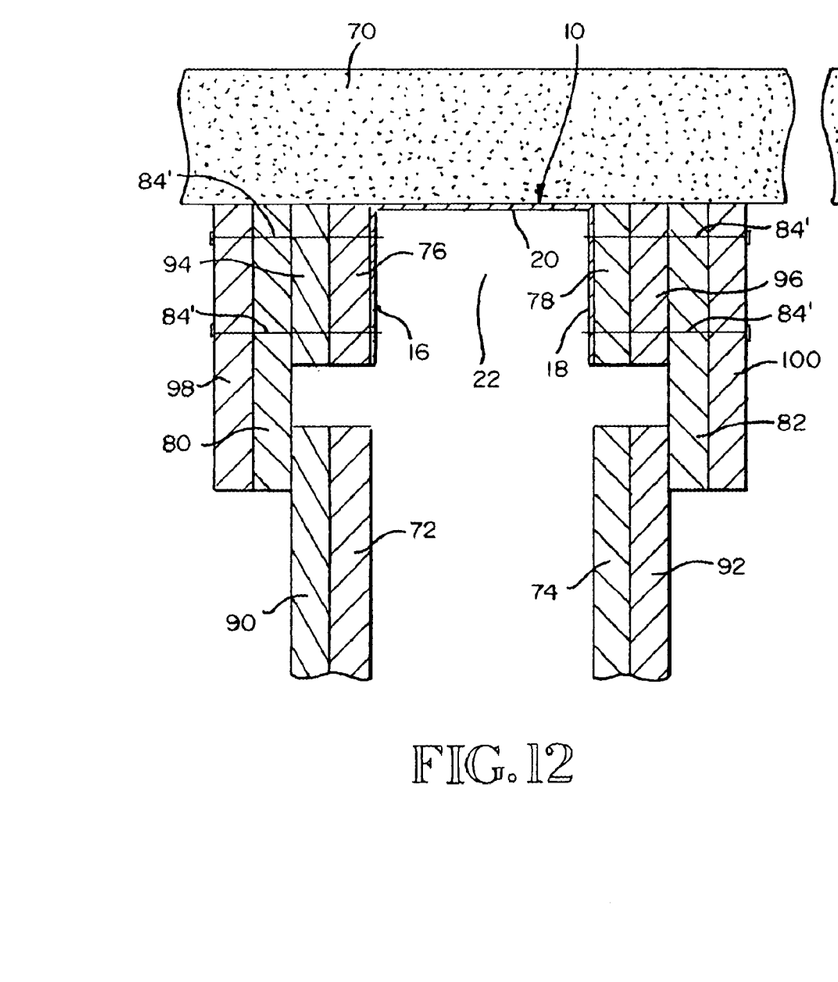
FIG. 12 is a view like FIG. 10, but showing a double-thickness of sheeting.
Figure 13:
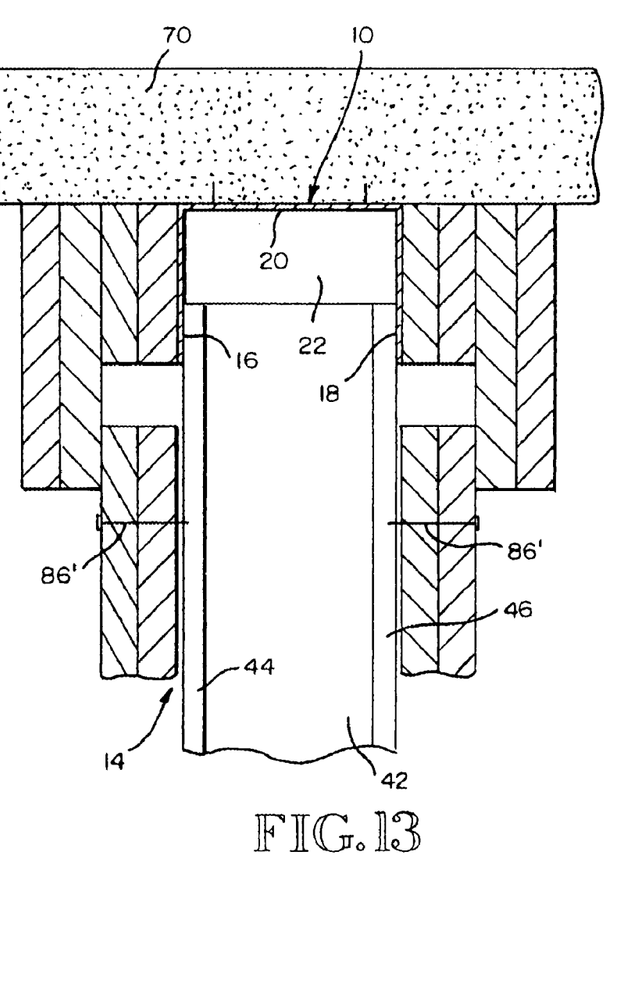
FIG. 13 is a view like FIG. 11, but showing a double-thickness of sheeting.

FIGS. 12 and 13 are very similar to FIGS. 10 and 11. The difference is that in FIGS. 12 and 13 there are two layers of sheeting everywhere there is a single layer of sheeting in FIGS. 10 and 11. Second layer sheeting 90, 92 is provided outwardly of first layer sheeting 72, 74. Second layer sheeting strips 94, 96, are provided outwardly of the first layer sheeting strips 76, 78. Second layer sheeting strips 98, 100, are provided outwardly of the first layer sheeting strips 80, 82. The screw fasteners 84', 86' are made longer than the fasteners 84, 86 so that they can extend through the double thickness of sheeting. The double thickness of sheeting provides additional fire protection which in many building structures is one of the purposes of the sheeting.

Figure 15:
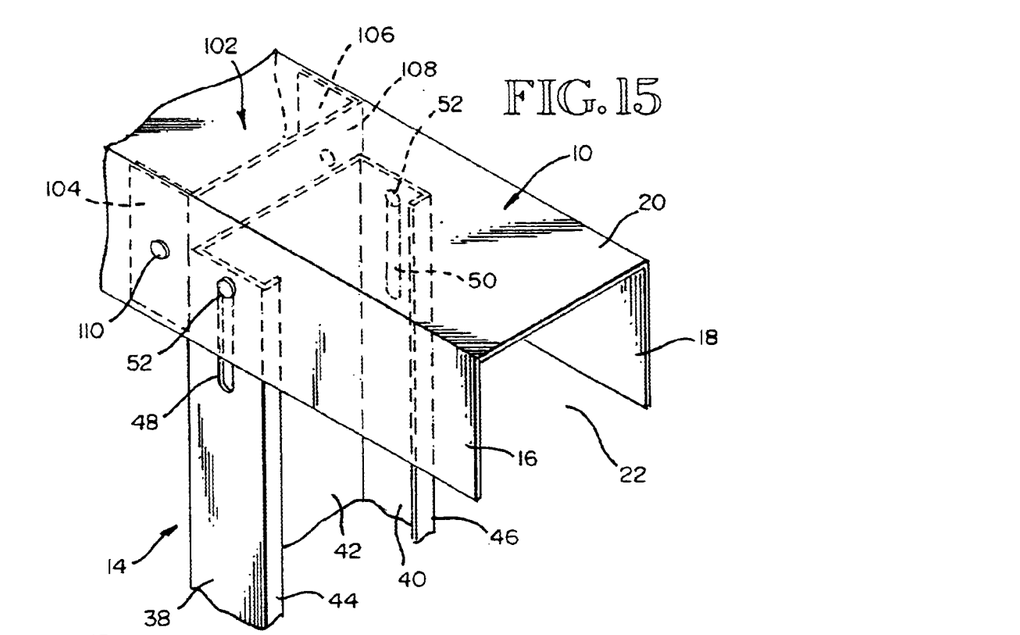
FIG. 15 is a fragmentary pictorial view of a modified construction of the wall structure, such view showing a reinforcement member inside of the upper channel member that is connected to the sidewalls of the upper channel member and is contiguous the upper end portion of the stud.
Figures 16, 17:
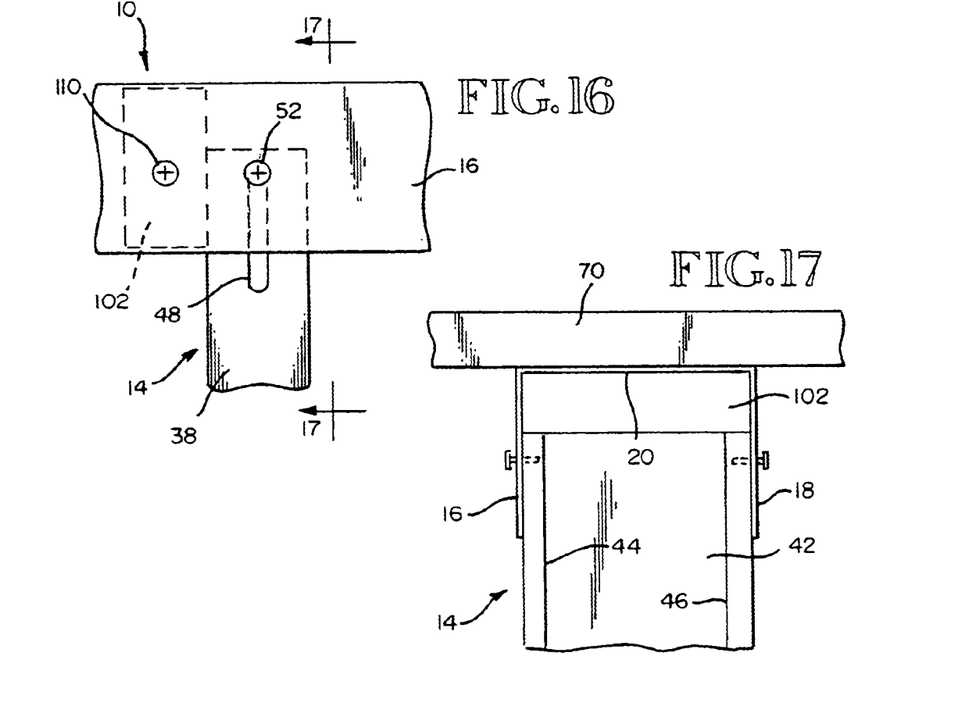
FIG. 16 is a side elevational view of the assembly shown by FIG. 15.
FIG. 17 is a sectional view taken substantially along line 17—17 of FIG. 16.

In preferred form, the stud 14 is a single elongated member. All of its parts 38, 40, 42, 44, 46 are linear. Sidewalls 38, 40 are parallel to each other and are perpendicular to the web 42 and the lips 44, 46. The lips 44, 46 are parallel to the web 42 and are perpendicular to the sidewalls 38, 40. In another embodiment of the invention, the upper end portion of the stud 14 that include the slots 48, 50 can be a separate piece that is connected to the rest of the stud 14, such as in the manner disclosed by FIG. 4 of my copending U.S. application Ser. No. 10/035,488. Another modification is shown by FIGS. 15–17. In this modification, a reinforcement member 102 is provided in the upper channel member 10 adjacent the upper end portion of at least some of the studs 14. This member may be a length of channel that is formed to include sidewalls 104, 106 and a web 108. The sidewalls 104, 106 are positioned immediately inside of the sidewalls 16, 18 and are connected to them by screw fasteners 110. The web 108 is positioned against web 42, as is best shown in FIGS. 15 and 16. That is, the sidewalls 104, 106 are contiguous the sidewalls 16, 18 and the web 108 is contiguous the web 42. The presence of the member 102 within the upper channel 10 strengthens the upper channel 10 and braces the connections between the upper end portions of the studs 14 and the upper channel 10. The presence of the member 102, secured to the sidewalls of the member 10, creates a stiffened region on the stud side of the member 102, formed by the web 108 and the sidewalls 16, 18 in the channel member 10. The connection of the sidewalls 104, 106 to the sidewalls 16, 18 stiffens the sidewalls 16, 18 in this region. It is this stiffened region that receives the upper end portions of the studs 14. As can be seen, the studs 14 are still free to move up and down relative to the upper channel member 10, within the upper channel space 22, because there is no connection between the studs 14 and the reinforcement members 102.

Figure 14:
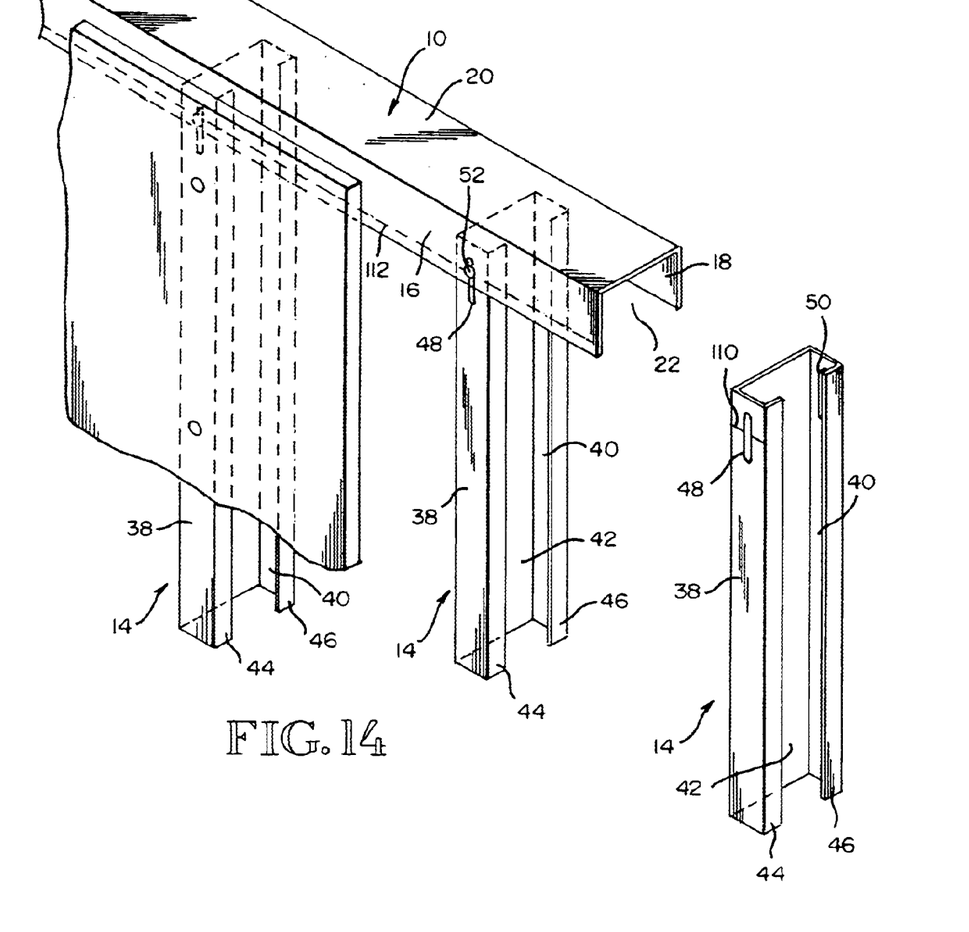
FIG. 14 is a pictorial view of a modified wall construction, showing a modified position of the sheeting and further showing gauge lines on sidewall portions of the upper channel member and on the upper end portion of the studs.

Referring to FIG. 14, the studs 14 may include gauge lines 110 that extend across the slots 48, 50. In FIG. 14, one gauge line 110 is shown associated with slot 48. A like gauge line is provided on sidewall 40 which cannot be seen in this view. It is positioned relative to slot 50 about the same way that gauge line 110 is related to slot 48. The sidewalls 16, 18 of the upper channel members 10 may also be provided with gauge lines 112. The gauge line 112 on sidewall 16 is shown in FIG. 14. There is a similar gauge line on the outside of sidewall 18. The gauge lines 110, 112 may be positioned to help position the studs 14 relative to the upper frame members 10. The gauge lines 110 may be positioned to be about at the same level as the lower edges of the sidewalls 16, 18. The gauge lines 112 mark the level of the screw fasteners 52. As shown by FIG. 14, the closed upper end of the slot 48 is positioned closer to the screw fastener 52 than is the closed lower end of the slot 48. The same thing is true with respect to the other screw fastener 52 (not shown) and the slot 50. The slots 48, 50 have lower portions that depend below the lower edges of the sidewalls 16, 20. This provides sufficient slot length below the screw fasteners 52 to allow the needed amount of upper movement of the studs 14.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather are to be determined by the following claims, interpreted according to accepted doctrines of patent claim interpretation, including use of the doctrine of equivalents and reversal of parts.

What is claimed is:

1. A structural wall, comprising: an elongated, downwardly opening, sheet-metal, upper channel member having spaced apart sidewalls defining an upper channel space between them; and an elongated sheet-metal stud including:

an upper end portion sized to fit within said upper channel space and including spaced apart sidewalls that are contiguous the sidewalls of the upper channel member when the upper end portion of the stud is within the upper channel space;

a screw fastener having a shank, a head and a threaded end portion opposite the head;

at least one sidewall of the upper end portion of the stud including a longitudinal slot for receiving the shank portion of the screw fastener, said slot being wider than the shank of the screw fastener;

said screw fastener extending through a sidewall of said upper channel member into said slot in said stud;

said slot being long enough to permit vertical movement of the stud relative to the screw fastener and the upper channel member;

wherein the screw fastener is adapted to be tightened to firmly connect it to the sidewall of the upper channel member, in a fixed position on said sidewall of the upper channel member, with its shank portion in the slot, free of connection with the upper end portion of said stud; and wherein the stud can move up and down relative to the screw and the upper channel member.

2. The structural wall of claim 1, further comprising an upwardly opening, lower, sheet-metal channel member having spaced apart sidewalls defining a lower channel space between them; and wherein the elongated stud has a lower end portion sized to fit within said lower channel space, said lower portion of the stud including spaced apart sidewalls that are contiguous the sidewalls of the lower channel member when the lower end portion of the stud is within the lower channel space; and wherein a fastener screws into at least one sidewall of the lower channel member and a contiguous sidewall of the lower end portion of the stud connects the lower end portion of the stud to the sidewall of the lower channel member.

3. The structural wall of claim 1, wherein the upper end portion of the stud includes a web that extends between and interconnects the sidewalls of the upper end portion of the stud; and said structural wall further including a reinforcing member within the upper channel space having sidewalls contiguous the sidewalls of the upper channel member, and having a portion connected to the sidewalls of the reinforcing member that contacts the web of the upper end portion of the stud; and screw fasteners extending through the sidewalls of the upper channel member and the sidewalls of the reinforcing member and connecting the reinforcing member to the upper channel member.

4. The structural wall of claim 2, wherein the upper end portion of the stud includes a web that extends between and interconnects the sidewalls of the upper end portion of the stud; and said structural wall further includes a reinforcing member within the upper channel space having sidewalls contiguous the sidewalls of the upper channel member, and having a portion connected to the sidewalls of the reinforcing member that contacts the web of the upper end portion of the stud; and screw fasteners extending through the sidewalls of the upper channel member and the sidewalls of the reinforcing member and connecting the reinforcing member to the upper channel member.

5. A structural wall, comprising:

an elongated, downwardly opening, sheet-metal, upper channel member having spaced apart sidewalls defining an upper channel space between them; and an elongated sheet-metal stud including:

an upper end portion sized to fit within said upper channel space and including spaced apart sidewalls that are contiguous the sidewalls of the upper channel member when the upper end portion of the stud is within the upper channel space;

two screw fasteners for each stud, each having a shank, a head and a threaded end portion opposite the head;

each said sidewall of the upper portion of the stud, including a longitudinal slot for receiving a shank of a said screw fastener, said slot being wider than the shank of the screw fastener;

said slots being long enough to permit vertical movement of the stud relative to the screw fasteners and the channel members;

wherein the screw fasteners are adapted to extend through the sidewalls of the upper channel member, and be tightened to firmly connect them to the sidewalls of the upper channel member, in a fixed position on said sidewalls of the upper channel member with their shanks in said slots, and said screw fasteners being free of connection with the stud; and wherein the stud can move up and down relative to the screw fasteners and the upper channel member.

6. The structural wall of claim 5, further comprising an upwardly opening, sheet-metal lower channel member having spaced apart sidewalls defining a lower channel space between them; and wherein the elongated stud has a lower end portion sized to fit within said lower channel space, said lower portion of the stud including spaced apart sidewalls that are contiguous the sidewalls of the lower channel member when the lower end portion of the stud is within the lower channel space; and wherein said sidewalls of the lower end portion of the stud are connected to the sidewalls of the lower channel member by screw fasteners that extend through the sidewalls of the lower channel member and the sidewalls of the lower end portion of the stud.

7. The structural wall of claim 5, wherein the upper end portion of the stud includes a web that extends between and interconnects the sidewalls of the stud; and said structural wall further including a reinforcing member within the upper channel space having sidewalls contiguous the sidewalls of the upper channel member, and having a portion connected to the sidewalls of the reinforcing member that contacts the web of the upper end portion of the stud; and screw fasteners extending through the sidewalls of the upper channel member and the sidewalls of the reinforcing member and connecting the reinforcing member to the upper channel member.

8. The structural wall of claim 6, wherein the upper end portion of the stud includes a web that extends between and interconnects the sidewalls of the upper end portion of the stud; and said structural wall further including a reinforcing member within the upper channel space having sidewalls contiguous the sidewalls of the upper channel member and having a portion connected to the sidewalls of the reinforcing member that contacts the web of the upper end portion of the stud; and screw fasteners extending through the sidewalls of the upper channel member and the sidewalls of the reinforcing member and connecting the reinforcing member to the upper channel member.

9. A structural wall, comprising:

an elongated, downwardly opening, sheet-metal upper channel member having spaced apart sidewalls defining an upper channel space between them;

an elongated, upwardly opening, sheet-metal lower channel member having spaced apart sidewalls defining a lower channel space between them;

a plurality of elongated studs spaced apart in parallelism and each said stud includes an upper end portion within the upper channel space and a lower end portion within the lower channel space;

each said upper end portion including spaced apart sidewalls that are contiguous the sidewalls of the upper channel member when the upper end portion of the stud is within the upper channel space;

each lower end portion having spaced apart sidewalls that are contiguous the sidewalls of the lower channel member when the lower end portion of the stud is within the lower channel space;

screw fasteners firmly connecting the sidewalls of the lower channel members to the sidewalls of the lower end portions of the studs;

wherein at least one sidewall of each upper end portion of each stud includes a longitudinal slot for receiving a shank portion of a screw fastener, said slot being wider than the shank portion of the screw fastener;

said slots being long enough to permit vertical movement of the studs relative to the screw fasteners and the upper channel member;

screw fasteners extending inwardly through openings in the sidewall of the upper channel member, and each including a shank portion that extends through and is received in a related one of said slots;

wherein the screw fasteners are tightened to firmly connect them to the sidewalls of the upper channel member in fixed positions on said sidewalls of the upper channel members, with their shank portions in the slots, free of connection with the studs; and wherein the studs can move up and down relative to the screw fasteners and the upper channel member.

10. The structural wall of claim 9, wherein each sidewall of the upper portion of each stud includes a longitudinal slot;

and, for each said slot, a separate screw fastener extends inwardly through a sidewall of the upper channel member, into and through its slot;

each said screw fastener being firmly connected to a sidewall of the upper channel member, with its shank portion in its slot, free of connection with the upper end portion of the related stud; and wherein the studs can move up and down relative to the screw fasteners and the upper channel member.

* * * * *